US011211204B2

(12) United States Patent
Yokokura et al.

(10) Patent No.: US 11,211,204 B2
(45) Date of Patent: Dec. 28, 2021

(54) SOLID ELECTROLYTIC CAPACITOR AND METHOD FOR MANUFACTURING SAME

(71) Applicant: JAPAN CAPACITOR INDUSTRIAL CO., LTD., Fussa (JP)

(72) Inventors: Osamu Yokokura, Nagaokakyo (JP); Tomoki Nobuta, Nagaokakyo (JP); Kazutoyo Horio, Nagaokakyo (JP); Kazumasa Fujimoto, Nagaokakyo (JP)

(73) Assignee: JAPAN CAPACITOR INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 16/818,164

(22) Filed: Mar. 13, 2020

(65) Prior Publication Data

US 2020/0219662 A1 Jul. 9, 2020

Related U.S. Application Data

(63) Continuation of application No. PCT/JP2017/034396, filed on Sep. 23, 2017.

(51) Int. Cl.
*H01G 9/15* (2006.01)
*H01G 9/00* (2006.01)
*H01G 9/012* (2006.01)

(52) U.S. Cl.
CPC ............. *H01G 9/15* (2013.01); *H01G 9/0032* (2013.01); *H01G 9/012* (2013.01)

(58) Field of Classification Search
CPC ......... H01G 9/15; H01G 9/0032; H01G 9/012
See application file for complete search history.

(56) References Cited

U.S. PATENT DOCUMENTS 5,184,287 A * 2/1993 Taniguchi .............. H01G 9/012 361/540
7,550,360 B2 * 6/2009 Yoshida ................. H01G 9/012 438/399
9,576,740 B2 * 2/2017 Shin ........................ H01G 9/052
2004/0066608 A1 * 4/2004 Takagi ................... H01G 9/012 361/530
2005/0117280 A1 6/2005 Audo
(Continued)

FOREIGN PATENT DOCUMENTS

CN 1476621 A 2/2004
CN 1624834 A 6/2005
(Continued)

OTHER PUBLICATIONS

International Search Report issued for PCT/JP2017/034396, dated Dec. 19, 2017.
(Continued)

*Primary Examiner* — Dion R. Ferguson
(74) *Attorney, Agent, or Firm* — Arent Fox LLP

(57) ABSTRACT

A solid electrolytic capacitor that includes a plurality of linear conductors arranged in parallel and made of a valve action metal in which a dielectric layer is formed on a surface of the valve action metal; a conductive polymer layer covering the plurality of linear conductors and shared by linear conductors; a conductor layer covering conductive polymer layer; an anode terminal in contact with end faces of the plurality of linear conductors; and a cathode terminal electrically connected to conductor layer.

23 Claims, 12 Drawing Sheets

11 15 2A 17 13 27 16 2A 19 12 19 19 14 26

(56) References Cited

U.S. PATENT DOCUMENTS

| | | | | |
|---|---|---|---|---|
| 2006/0262490 | A1* | 11/2006 | Saitou | H01G 9/15 361/540 |
| 2006/0285276 | A1* | 12/2006 | Kuriyama | H01G 9/052 361/523 |
| 2008/0037201 | A1* | 2/2008 | Kuriyama | H01G 9/042 361/528 |
| 2009/0310283 | A1 | 12/2009 | Kim et al. | |
| 2010/0165547 | A1* | 7/2010 | Kuranuki | H01G 9/15 361/525 |
| 2010/0246098 | A1 | 9/2010 | Ibata et al. | |
| 2015/0348715 | A1 | 12/2015 | Chacko et al. | |
| 2016/0351337 | A1 | 12/2016 | Uher et al. | |
| 2017/0287647 | A1* | 10/2017 | Nobuta | H01G 9/012 |
| 2017/0365419 | A1* | 12/2017 | Demizu | H01G 9/012 |
| 2019/0355526 | A1* | 11/2019 | Yokokura | H01G 9/012 |

FOREIGN PATENT DOCUMENTS

| | | | |
|---|---|---|---|
| CN | 101609749 | A | 12/2009 |
| CN | 101853741 | A | 10/2010 |
| CN | 106206027 | A | 12/2016 |
| CN | 106663542 | A | 5/2017 |
| JP | H0239416 | A | 2/1990 |
| JP | H0629164 | A | 2/1994 |
| JP | H06196373 | A | 7/1994 |
| JP | 2003133183 | A | 5/2003 |
| JP | 2006004984 | A | 1/2006 |
| JP | 2006005309 | A | 1/2006 |
| JP | 2006032516 | A | 2/2006 |
| JP | 2010021168 | A | 1/2010 |
| JP | 2012069631 | A | 4/2012 |

OTHER PUBLICATIONS

Written Opinion of the International Searching Authority issued for PCT/JP2017/034396, dated Dec. 19, 2017.

Japanese Office Action issued for corresponding application No. JP 2016-177179, dated Office Action Jun. 2, 2020.

Chinese Office Action issued for corresponding CN Application No. 201780095029.4, date of Chinese Office Action dated Apr. 1, 2021.

* cited by examiner

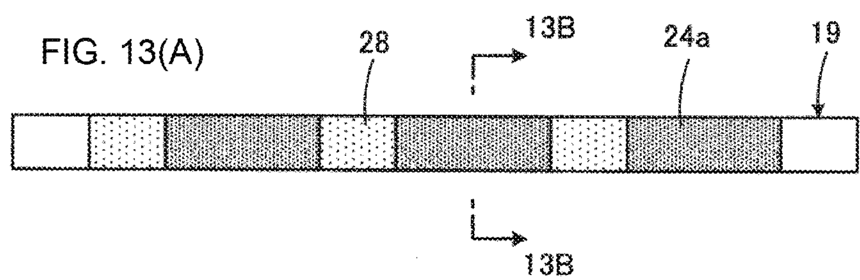
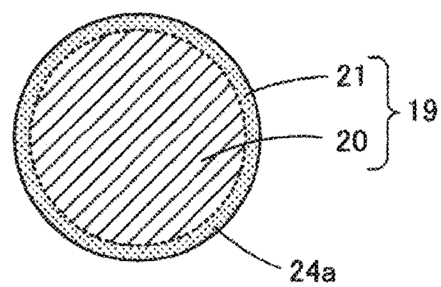
FIG.14
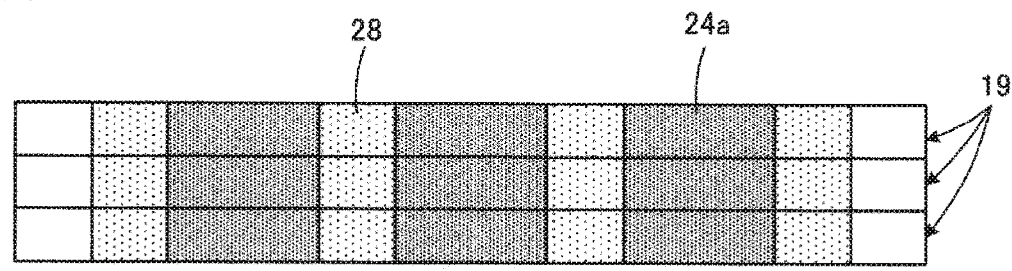

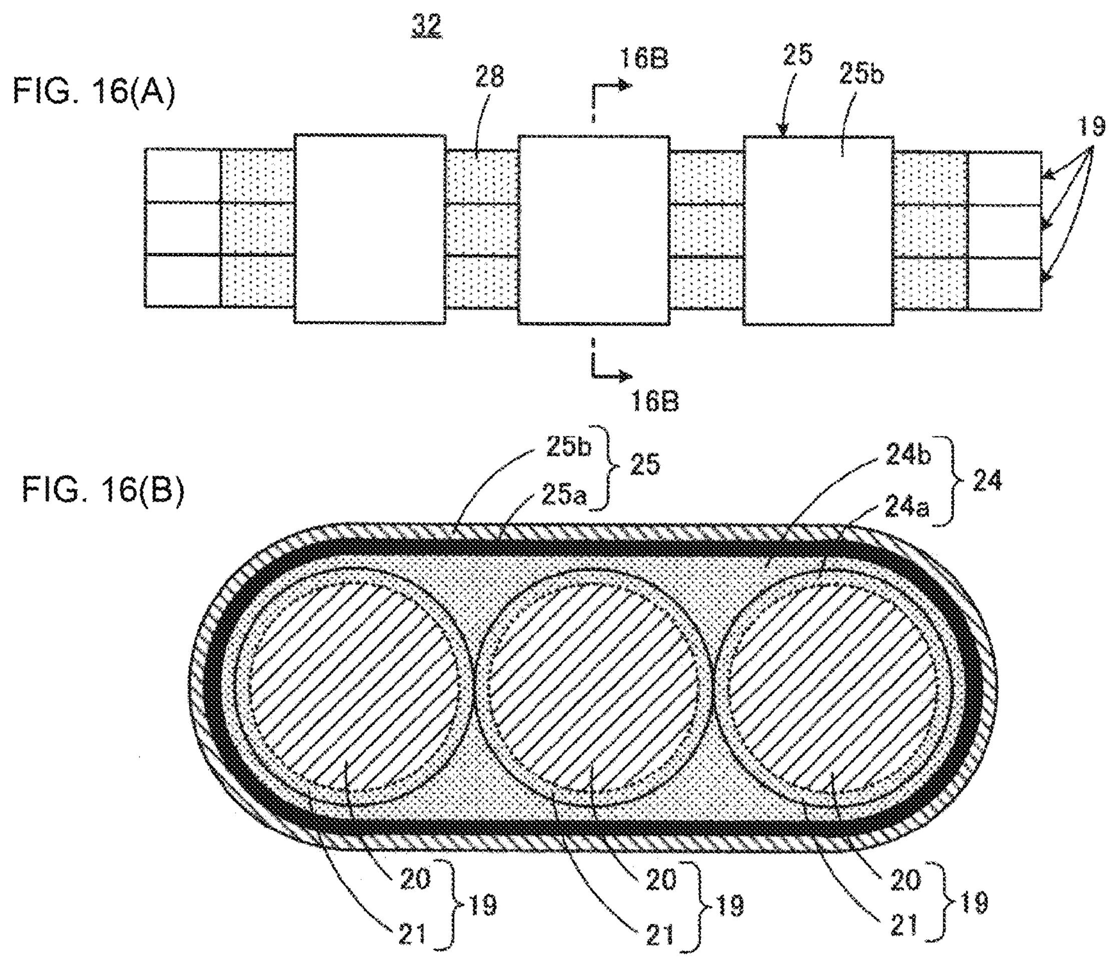
32
FIG. 16(A)
28
16B
25
25b
19
16B
FIG. 16(B)
25b
25a
25
24b
24a
24
20
21
19
20
21
19
20
21
19
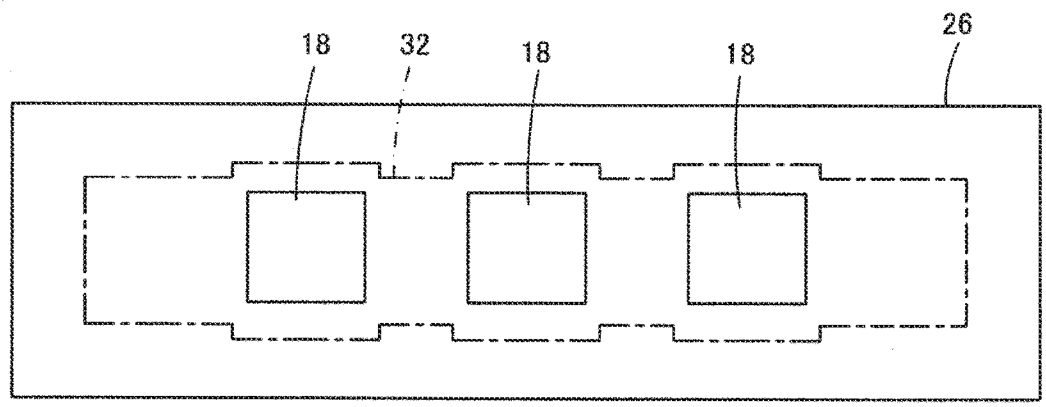
FIG.17
18
32
18
18
26

SOLID ELECTROLYTIC CAPACITOR AND METHOD FOR MANUFACTURING SAME

CROSS REFERENCE TO RELATED APPLICATIONS

The present application is a continuation of International application No. PCT/JP2017/034396, filed Sep. 23, 2017, the entire contents of which is incorporated herein by reference.

FIELD OF THE INVENTION

The present invention relates to a solid electrolytic capacitor and a method for manufacturing the same, and more particularly to a solid electrolytic capacitor having a structure, in which a linear conductor made of a valve action metal is used as an anode-side element and a plurality of these linear conductors are arranged in parallel, and a method for manufacturing the same.

BACKGROUND OF THE INVENTION

Not only the solid electrolytic capacitor is used as a general capacitor in a decoupling circuit or a power supply circuit, but also the solid electrolytic capacitor is advantageously used as a noise filter that removes a high-frequency noise.

For example, Japanese Patent Laying-Open No. 6-196373 (PTL 1) discloses a solid electrolytic capacitor having an interest to the present invention. The solid electrolytic capacitor of PTL 1 includes a linear conductor made of a valve action metal functioning as an anode-side element. FIG. 19 is a sectional view schematically illustrating a solid electrolytic capacitor 1 having the same basic configuration as the solid electrolytic capacitor of PTL 1.

With reference to FIG. 19, solid electrolytic capacitor 1 includes a linear conductor 2 made of the valve action metal. Linear conductor 2 includes a core 3 extending in an axial direction (a direction orthogonal to a paper surface in FIG. 19) of linear conductor 2 and a porous portion 4 covering a peripheral surface of core 3 and including a large number of pores. For example, etching is performed on the peripheral surface of linear conductor 2 formed of an aluminum wire to roughen the peripheral surface, thereby forming porous portion 4.

Although not illustrated, a large number of pores including openings facing outward are formed in porous portion 4. Although not illustrated, the dielectric layer is formed along the inner peripheral surface of the pores by oxidizing a surface of linear conductor 2.

A conductive polymer layer 5 as a solid electrolyte is formed so as to cover linear conductor 2 with the dielectric layer interposed therebetween. A part of conductive polymer layer 5 is filled in the pores of porous portion 4 of linear conductor 2.

A conductor layer 6 is formed so as to cover conductive polymer layer 5. Although there is no specific description in PTL 1, in current products, conductor layer 6 often includes a carbon layer 6*a* on conductive polymer layer 5 and a metal layer 6*b* made of, for example, silver on carbon layer 6*a*.

An anode terminal 7 is electrically connected to core 3 of linear conductor 2. On the other hand, a cathode terminal 8 is electrically connected to conductor layer 6, more specifically, metal layer 6*b*.

SUMMARY OF THE INVENTION

When the plurality of solid electrolytic capacitors 1 are used and connected in parallel, a lower equivalent series resistance (ESR) and a higher capacitance can be achieved. In this case, when downsizing and easy handling of components are pursued, as illustrated in FIG. 20, it is considered that a plurality of, for example, three linear conductors 2 are arranged in parallel to form a solid electrolytic capacitor 1*a* as one component. In FIG. 20, the element corresponding to the element in FIG. 19 is denoted by the same reference numeral, and the overlapping description will be omitted.

As illustrated in FIG. 20, in solid electrolytic capacitor 1*a*, the cathode-side elements, namely, conductive polymer layer 5, and carbon layer 6*a* and metal layer 6*b* as conductor layer 7, are provided in relation to each of three linear conductors 2. Three linear conductors 2 are arranged in parallel while the metal layers 6*b* covering adjacent linear conductors 2 are in contact with each other. In FIG. 20, a rectangle indicated by an alternate long and short dash line indicates a main body 9 of solid electrolytic capacitor 1*a*, main body 9 being formed by covering linear conductor 2, conductive polymer layer 5, and conductor layer 6 with an insulating material. Although not illustrated, the anode terminal and the cathode terminal of solid electrolytic capacitor 1*a* are provided so as to be exposed to an outer surface of main body 9.

However, solid electrolytic capacitor 1*a* of FIG. 20 has a problem in that a ratio of a thickness of the cathode-side element to a product size is relatively large. For this reason, this obstructs the downsizing and high capacitance of solid electrolytic capacitor 1*a*.

In order to manufacture solid electrolytic capacitor 1*a*, it is necessary to perform a process of forming conductive polymer layer 5 and a conductor layer 6 including carbon layer 6*a* and metal layer 6*b* on each of the plurality of linear conductors 2. Thus, an increase in the number of linear conductors 2 leads to an increase in the number of processes.

An object of the present invention is to provide a structure and a manufacturing method in which the number of manufacturing processes can be decreased while downsizing is achieved in a solid electrolytic capacitor including a plurality of linear conductors made of a valve action metal for proposal of achievement of a lower ESR and a higher capacitance.

In order to solve the above technical problem, according to one aspect of the present invention, a solid electrolytic capacitor includes a plurality of linear conductors arranged in parallel and made of a valve action metal in which a dielectric layer is formed on a surface of the valve action metal; a conductive polymer layer covering the plurality of linear conductors and shared by the plurality of linear conductors; a conductor layer covering the conductive polymer layer; an anode terminal in contact with end faces of the plurality of linear conductors; and a cathode terminal electrically connected to the conductor layer.

In this configuration, it is particularly noticed that the conductive polymer layer is formed so as to cover the plurality of linear conductors with the dielectric layer interposed therebetween while being shared by the linear conductors. With this configuration, volume efficiency is high, and the plurality of linear conductors can be arranged closer to each other than that of the capacitor of FIG. 20.

In the solid electrolytic capacitor of the present invention, the conductive polymer layer is preferably formed so as to cover each linear conductor with the dielectric layer interposed therebetween. Alternatively, according to another aspect of the present invention, the conductor layer is formed so as to cover the plurality of linear conductors with the dielectric layer and the conductive polymer layer interposed therebetween while being shared by the linear conductors. With this configuration, the plurality of linear conductors can be arranged close to each other although the conductive polymer layer is interposed therebetween.

Preferably, the solid electrolytic capacitor of the present invention includes a rectangular parallelepiped-shaped main body formed by covering the plurality of linear conductors, the conductive polymer layer, and the conductor layer with an insulating material, the rectangular parallelopiped-shaped main body including a pair of end faces facing each other and a bottom surface adjacent to the end face. With this configuration, the solid electrolytic capacitor can be handled as a chip-shaped electronic component.

In the preferred embodiment, the solid electrolytic capacitor of the present invention is a three-terminal type solid electrolytic capacitor in which the pair of anode terminals is disposed on the pair of end faces of the main body, and the cathode terminal is disposed on the bottom surface of the main body, and which further includes an anode-side electric insulating member electrically insulating the anode terminal from the conductive polymer layer and the conductor layer.

On the other hand, in another preferred embodiment, the solid electrolytic capacitor of the present invention is a two-terminal type solid electrolytic capacitor in which the anode terminal is disposed on one of the end faces of the main body, and the cathode terminal is disposed on the other end face of the main body, and which further includes: an anode-side electric insulating member electrically insulating the anode terminal from the conductive polymer layer and the conductor layer; and a cathode-side electric insulating member electrically insulating the cathode terminal from the linear conductor, the conductive polymer layer and the conductor layer.

In the solid electrolytic capacitor of the present invention, preferably, the conductor layer has a laminated structure including a carbon layer in contact with the conductive polymer layer and a metal layer formed on the carbon layer. The metal layer can contribute to a decrease in ESR.

In the solid electrolytic capacitor of the present invention, preferably, each of the linear conductors includes a core extending in an axial direction of each of the linear conductors and a porous portion covering a peripheral surface of the core and including a large number of pores, and the dielectric layer extends along an inner peripheral surface of the pores of the porous portion. With this configuration, an area where the conductive polymer layer and the linear conductor are opposite to each other with the dielectric layer interposed therebetween can be enlarged, and a large static capacitance can be obtained.

In the solid electrolytic capacitor of the present invention, preferably, the anode terminal is in contact with the cores of the linear conductors. With this configuration, a conductive path length on an anode terminal side can be shortened, which can contribute to the decrease in ESR.

According to still another aspect of the present invention, a method for manufacturing a solid electrolytic capacitor includes: preparing a plurality of linear conductors arranged in parallel and made of a valve action metal in which a dielectric layer is formed on a surface of the valve action metal; covering the linear conductor with a conductive polymer layer; covering the conductive polymer layer with a conductor layer; providing an anode terminal to be in contact with an end face of the linear conductor; and providing a cathode terminal to be electrically connected to the conductor layer. With this configuration, the number of manufacturing processes can be decreased.

In the method for manufacturing a solid electrolytic capacitor according to the present invention, the step of forming the conductor layer with the plurality of linear conductors arranged in parallel does not exclude the step of forming the conductive polymer layer before the formation of the conductor layer.

In particular, when the linear conductor includes a core extending in an axial direction of the linear conductor and a porous portion covering a peripheral surface of the core and including a large number of pores, and when the dielectric layer to extend along an inner peripheral surface of the pores of the porous portion, the step of forming the conductive polymer layer is preferably performed on each linear conductor and with the plurality of linear conductors arranged in parallel. The step of filling a part of the conductive polymer layer with the pores of the porous portion is more efficiently performed on the individual linear conductor.

In the present invention, in the solid electrolytic capacitor including the plurality of linear conductors, the size can further be reduced, the number of manufacturing processes can be decreased, and cost can be reduced.

BRIEF DESCRIPTION OF THE DRAWINGS

FIG. 11(A) is a plan view illustrating prepared linear conductor 19, and FIG. 11(B) is an enlarged sectional view taken along line 11B-11B in FIG. 11(A).

FIG. 13(A) is a plan view illustrating linear conductor 19 in which a first conductive polymer layer 24*a* is formed by filling a porous portion 21, FIG. 13(B) is an enlarged sectional view taken along line 13B-13B in FIG. 13(A).

FIG. 14 is a view illustrating a process subsequent to the process in FIG. 13, and is a plan view illustrating a state in which three linear conductors 19 are arranged in parallel.

FIG. 16(A) is a plan view illustrating linear conductor 19 in which conductor layer 25 is formed on second conductive polymer layer 24*b*, and FIG. 16(B) is an enlarged sectional view taken along line 16B-16B in FIG. 16(A).

FIG. 17 is a view illustrating a process subsequent to the process in FIG. 16, and is a plan view illustrating a substrate 26 holding a prepared cathode terminal 18.

DETAILED DESCRIPTION OF THE PREFERRED EMBODIMENTS

Figure 1:
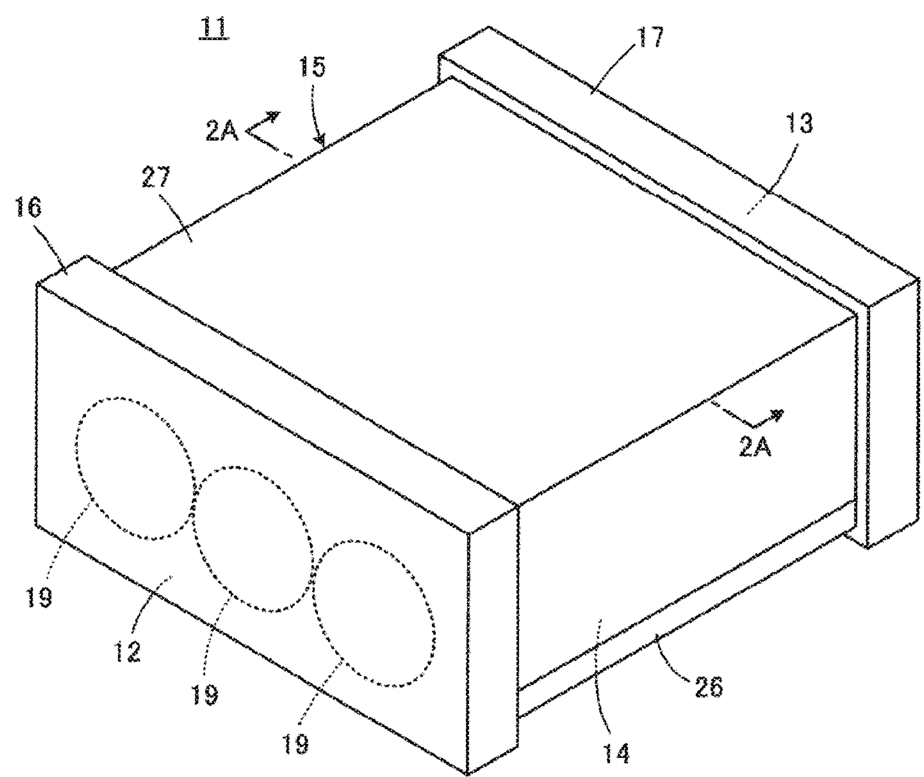
FIG. 1 is a perspective view illustrating an appearance of a solid electrolytic capacitor 11 according to a first embodiment of the present invention.

With reference to FIGS. 1 to 4, a solid electrolytic capacitor 11 according to a first embodiment of the present invention will be described below.

Solid electrolytic capacitor 11 includes a rectangular parallelepiped-shaped main body 15 including a pair of end faces 12 and 13 opposite to each other and a bottom face 14 adjacent to end faces 12 and 13. In solid electrolytic capacitor 11 that is a three-terminal type, a pair of anode terminals 16 and 17 are disposed on the pair of end faces 12 and 13 of main body 15, and a cathode terminal 18 is disposed on bottom face 14 of main body 15.

Solid electrolytic capacitor 11 includes a plurality of linear conductors 19, for example, three linear conductors 19 made of a valve action metal. For example, aluminum, tantalum, niobium, titanium, or an alloy containing at least one of these is used as the valve action metal constituting linear conductor 19. In the first embodiment, linear conductor 19 is a columnar shape. Preferably, an aluminum wire is used as linear conductor 19 because the aluminum wire is inexpensive and easily available.

Figure 2A:
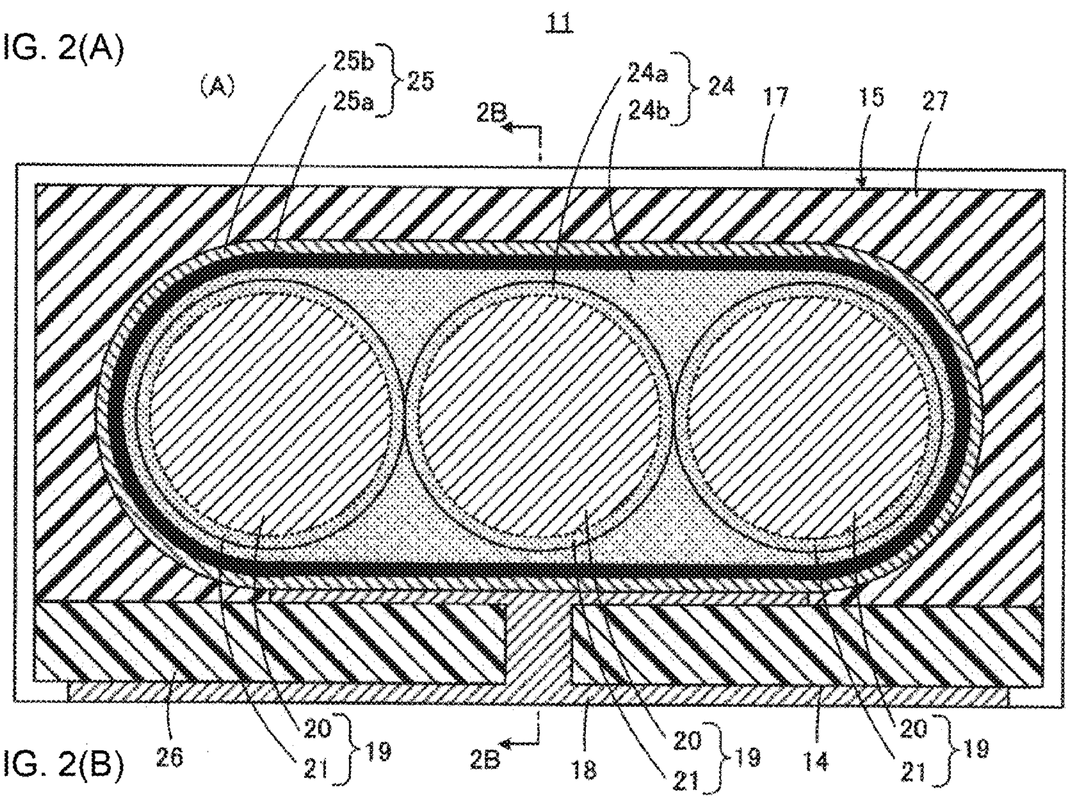
FIG. 2(A) is a sectional view taken along line 2A-2A in FIG. 1.
Figure 3:
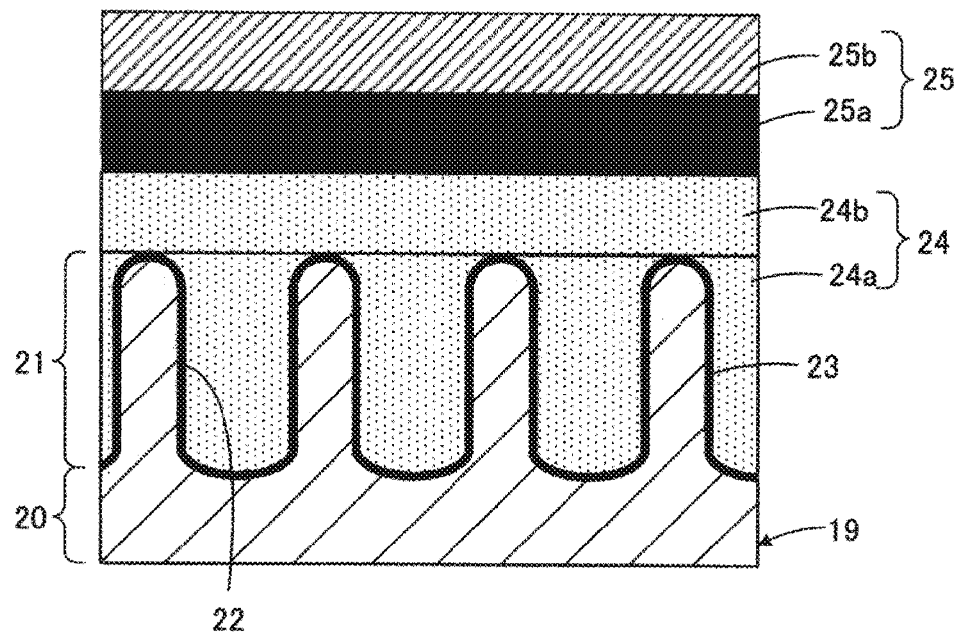
FIG. 3 is a sectional view schematically illustrating an enlarged portion III in FIG. 2(B).
Figure 4:
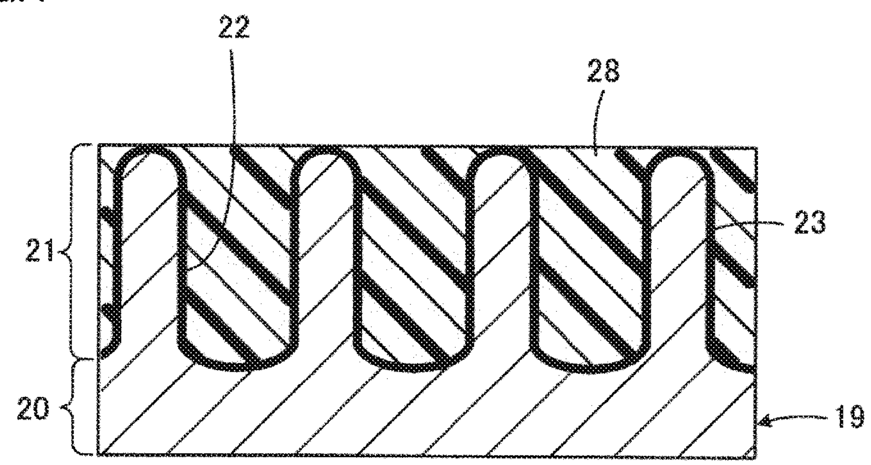
FIG. 4 is a sectional view schematically illustrating an enlarged portion IV in FIG. 2(B).

Linear conductor 19 includes a core 20 extending in an axial direction of linear conductor 19 and a porous portion 21 covering a peripheral surface of core 20 and including a large number of pores. For example, etching is performed on the peripheral surface of linear conductor 19 formed of the aluminum wire to roughen the peripheral surface, thereby forming porous portion 21. As schematically illustrated in FIGS. 3 and 4, a large number of pores 22 including openings facing outward are formed in porous portion 21. In FIG. 2(A), a boundary between core 20 and porous portion 21 is indicated by a dotted line.

As illustrated in FIGS. 3 and 4, a dielectric layer 23 is formed on a surface of linear conductor 19. For example, dielectric layer 23 is formed by oxidizing the surface of linear conductor 19 in which porous portion 21 is formed. In FIGS. 3 and 4, dielectric layer 23 is indicated by a bold line. Dielectric layer 23 is formed so as to extend along an inner peripheral surface of pore 22 of porous portion 21.

Solid electrolytic capacitor 11 further includes a conductive polymer layer 24 as a solid electrolyte that covers linear conductor 19 with dielectric layer 23 interposed therebetween, and the conductive polymer layer is shared by three linear conductors 19. Because dielectric layer 23 is formed along the inner peripheral surface of pores 22 of porous portion 21, conductive polymer layer 24 is in contact with dielectric layer 23 over a wide area. Conductive polymer layer 24 is divided into a first conductive polymer layer 24*a* filling pores 22 of porous portion 21 and a second conductive polymer layer 24*b* located on the outer peripheral surface of linear conductor 19 due to a manufacturing method (to be described later). Polythiophene, polyacetylene, polypyrrole, polyaniline, and the like that contain an anion as a dopant are used as a material for conductive polymer layer 24.

In the state of FIG. 2(A), three linear conductors 19 are arranged so as to be in contact with each other, but may slightly be separated from each other.

As described above, linear conductor 19 has a form in which the peripheral surface of core 20 is covered with porous portion 21. Linear conductor 19 preferably has a columnar shape or a shape similar to the columnar shape, for example, an elliptic columnar shape, a flat columnar shape, or a shape in which a ridge portion of a prism is rounded. When linear conductor 19 has the columnar shape or a shape similar to the columnar shape, a corner does not exist on the peripheral surface of linear conductor 19. For this reason, a formation property of conductive polymer layer 24 can be improved.

When the corner exists on the peripheral surface of linear conductor 19, for example, a part of the corner cannot be covered with conductive polymer layer 24, and linear conductor 19 is exposed, so that a capacitor failure is easily generated. Even when the corner is covered with conductive polymer layer 24, a formed thickness becomes thinner at the corner and the flat portion becomes thicker, so that uniformity tends to be poor. For this reason, a height of solid electrolytic capacitor 11 is hardly reduced. In other words, the excellent formation property of conductive polymer layer 24 means that the thickness of conductive polymer layer 24 is excellent in uniformity. Thus, preferably, linear conductor 19 does not have the corner on the peripheral surface of linear conductor 19. As used herein, the corner means a portion that is not rounded like an acute angle or an obtuse angle.

When linear conductor 19 has the columnar shape, the entire circumferential surface of linear conductor 19 can be used as a capacitance appearance portion, so that an area of the capacitance appearance portion can be expanded about 1.5 times a metal foil such as an aluminum foil.

Solid electrolytic capacitor 11 further includes a conductor layer 25 that covers conductive polymer layer 24. In the first embodiment, conductor layer 25 has a laminated structure including a carbon layer 25*a* contacting with conductive polymer layer 24 and a metal layer 25*b* formed on carbon layer 25*a*. For example, metal layer 25*b* is made of a conductive resin in which powder of silver, nickel, copper, tin, gold, palladium, or the like are dispersed in resin. Alternatively, metal layer 25*b* may be formed of a plating film made of, for example, silver, nickel, copper, or tin. As in an embodiment described below with reference to FIGS. 8 and 9, conductor layer 25 may have a single-layer structure.

Main body 15 of solid electrolytic capacitor 11 is formed by covering, with an insulating material, three linear conductors 19, and conductive polymer layer 24 and conductor layer 25 that are provided in association with each of linear conductors 19. The insulating material includes a substrate 26 holding cathode terminal 18 and a sealing material 27 including an insulating resin covering conductor layer 25.

Cathode terminal 18 is provided so as to penetrate substrate 26 in a thickness direction, contacts with metal layer 25*b* of conductor layer 25 on an upper main surface side of substrate 26, and exposed to the bottom of main body 15 on a lower main surface side of substrate 26. Although not illustrated, cathode terminal 18 and metal layer 25*b* are bonded together with a conductive adhesive. For example, an adhesive containing a filler of silver, nickel, copper, tin, gold, or palladium and resin such as epoxy and phenol is used as the conductive adhesive. Welding may be applied instead of the conductive adhesive.

For example, a printed board is used as substrate 26. Sealing material 27 may include a filler of alumina or silica or a magnetic material in addition to the resin. When sealing material 27 contains the filler, mechanical strength and workability of sealing material 27 can be adjusted. Heat shrinkability can be adjusted by selecting the filler having a desired coefficient of linear expansion. When sealing material 27 contains the magnetic material, an impedance of the capacitor can intentionally be increased. For example, there is a possibility of generating anti-resonance when a plurality of low-impedance capacitors are mounted in parallel. At this point, when sealing material 27 contains the magnetic material, the generation of the anti-resonance can be prevented. For example, magnetic powder such as iron powder, powder of an alloy containing iron, and powder of ferrite is used as the magnetic material. The magnetic material may be a mixture of powders having different particle sizes or at least two kinds of powders having different compositions. In this way, the desired filler or magnetic material can be selected and used according to a required function.

Figure 2B:
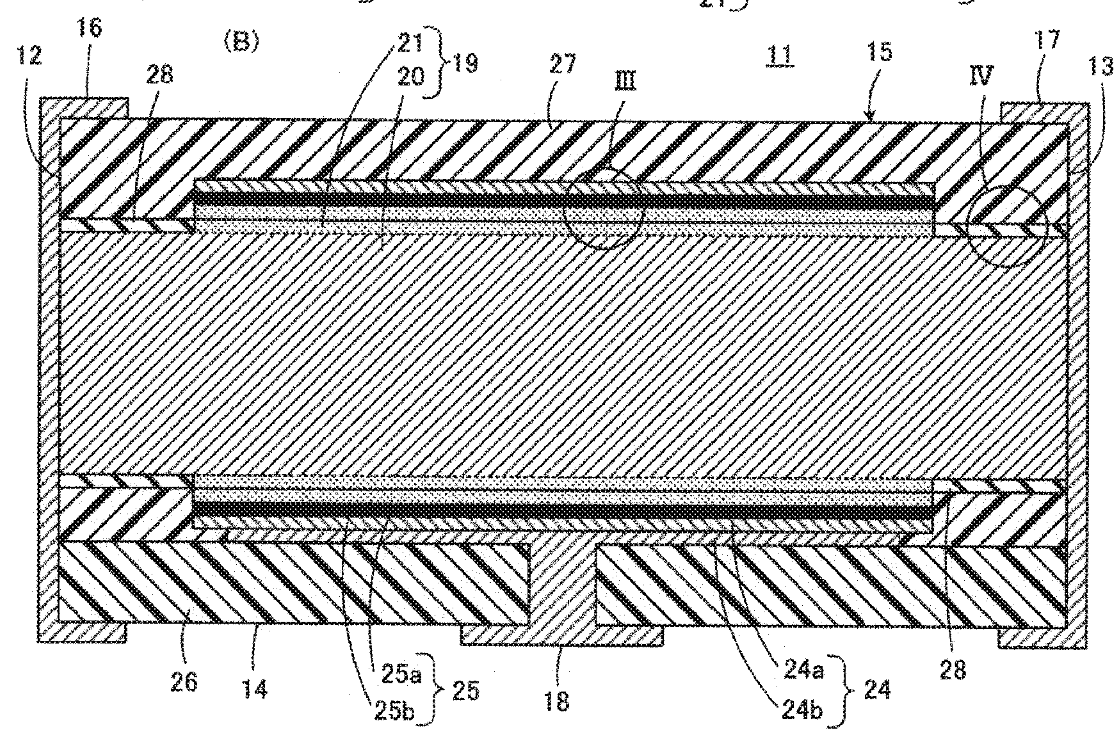
FIG. 2(B) is a sectional view taken along line 2B-2B in FIG. 2(A).

As illustrated in FIG. 2(B), both end faces of linear conductor 19 are exposed from sealing material 27, and contact with the pair of anode terminals 16 and 17 on the pair of end faces 12 and 13 of main body 15, respectively, thereby achieving electric connection. For example, anode terminals 16 and 17 are formed of a conductive resin film containing at least one of silver, copper, nickel, tin, gold and palladium as a conductive component and an epoxy resin or a phenol resin as a resin component.

As a modification, anode terminals 16 and 17 may be formed of a plating film containing metal such as nickel, zinc, copper, tin, gold, silver or palladium or an alloy containing at least one kind of these metals, and formed on the end face of core 20 of linear conductor 19. Alternatively, anode terminals 16 and 17 may have a multilayer structure including a conductive resin film and a plating film. Anode terminals 16 and 17 may include two plating layers and a conductive resin layer between the plating layers.

An anode-side electric insulating member 28 made of an electric insulating resin is disposed between conductive polymer layer 24 and anode terminals 16 and 17. For example, an epoxy resin, a phenol resin, a polyimide resin, and the like are used to form anode-side electric insulating member 28. Anode-side electric insulating member 28 can reliably achieve an electric insulation state between conductive polymer layer 24 and conductor layer 25 and anode terminals 16 and 17. In the first embodiment, as illustrated in FIG. 4, in a portion in which anode-side electric insulating member 28 is in contact with core 20, anode-side electric insulating member 28 is provided so as to fill pores 22 of porous portion 21.

As a modification, at both the ends of linear conductor 19, anode-side electric insulating member 28 may be provided so as to contact with core 20 with porous portion 21 removed to expose core 20.

In both of these cases described above, anode-side electric insulating member 28 is in contact with core 20. With this configuration, for example, when wet plating is applied to form anode terminals 16 and 17, inconvenience that a plating solution permeates through and remains in porous portion 21 can hardly be generated. Conductive polymer layer 24 and conductor layer 25 may extend toward anode terminals 16 and 17 as long as conductive polymer layer 24 and conductor layer 25 do not come into contact with anode terminals 16 and 17, and may overlap anode-side electric insulating member 28.

Figure 20:
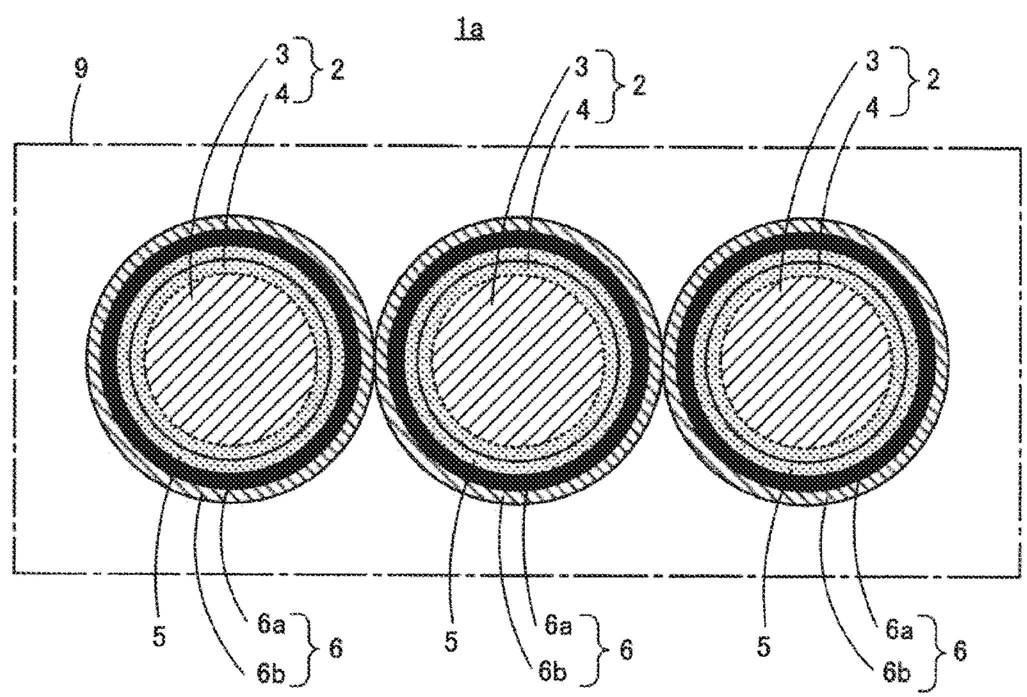
FIG. 20 is a sectional view schematically illustrating a state in which three linear conductors 2 in FIG. 19 are arranged in parallel to form a solid electrolytic capacitor 1*a* as one component.

In solid electrolytic capacitor 1*a* of FIG. 20, for example, it is assumed that a wire-shaped linear conductor 2 having a diameter of 0.3 mm is used. When a portion of conductive polymer layer 5, the portion protruding from the outer peripheral surface of the linear conductor 2 has the thickness of 0.01 mm, when a carbon layer 6*a* has the thickness of 0.02 mm, and when the metal layer 6*b* has the thickness of 0.02 mm, the diameter of one linear conductor 2 becomes 0.3 mm+(0.01 mm+0.02 mm+0.02 mm)×2=0.4 mm. Thus, when three linear conductors 2 are arranged in parallel, a total dimension in the arrangement direction becomes 0.4 mm×3=1.2 mm.

On the other hand, for solid electrolytic capacitor 11 of the first embodiment, the total dimension of three linear conductors 19 in the arrangement direction becomes 0.3 mm×3+(0.01 mm+0.02 mm+0.02 mm)×2=1.0 mm, which means that downsizing can be achieved.

Further, in solid electrolytic capacitor 11 of the first embodiment, the pair of anode terminals 16 and 17 is disposed on the pair of end faces 12 and 13 of main body 15, and both the end faces of core 20 in linear conductor 19 are in contact with the pair of anode terminals 16 and 17, so that a conductive path length on the sides of anode terminals 16 and 17 can be shortened. Thus, a parasitic inductance generated in the conductive paths on the sides of anode terminals 16 and 17 can be decreased, and noise removal performance of solid electrolytic capacitor 11 can be enhanced in a high-frequency band (ωL).

Anode terminals 16 and 17 that do not contribute to capacitance formation are disposed on end faces 12 and 13 of main body 15, and the end faces of core 20 of linear conductor 19 directly contact with anode terminals 16 and 17, so that a ratio of the members that do not contribute to the capacitance formation to a total volume is relatively low and volume efficiency is high. For this reason, solid electrolytic capacitor 11 of the first embodiment is suitable for the downsizing and large capacitance. Thus, the high noise removal performance can be exhibited even in the frequency band (1/ωC) due to the capacitance.

As described above, in solid electrolytic capacitor 11, the high noise removal performance can be exhibited in the wide frequency band including the high frequency band caused by inductance and the frequency band caused by capacitance.

Both the end faces of core 20 of linear conductor 19 are in relatively large surface contact with the pair of anode terminals 16 and 17, so that a resistance can be kept low in the electrical connection portion between core 20 of linear conductor 19 and anode terminals 16 and 17. For this reason, a large current can be passed through solid electrolytic capacitor 11.

The conductive path length made on the side of cathode terminal 18 is relatively short, so that the parasitic inductance generated in the conductive path can be decreased.

Figure 5:
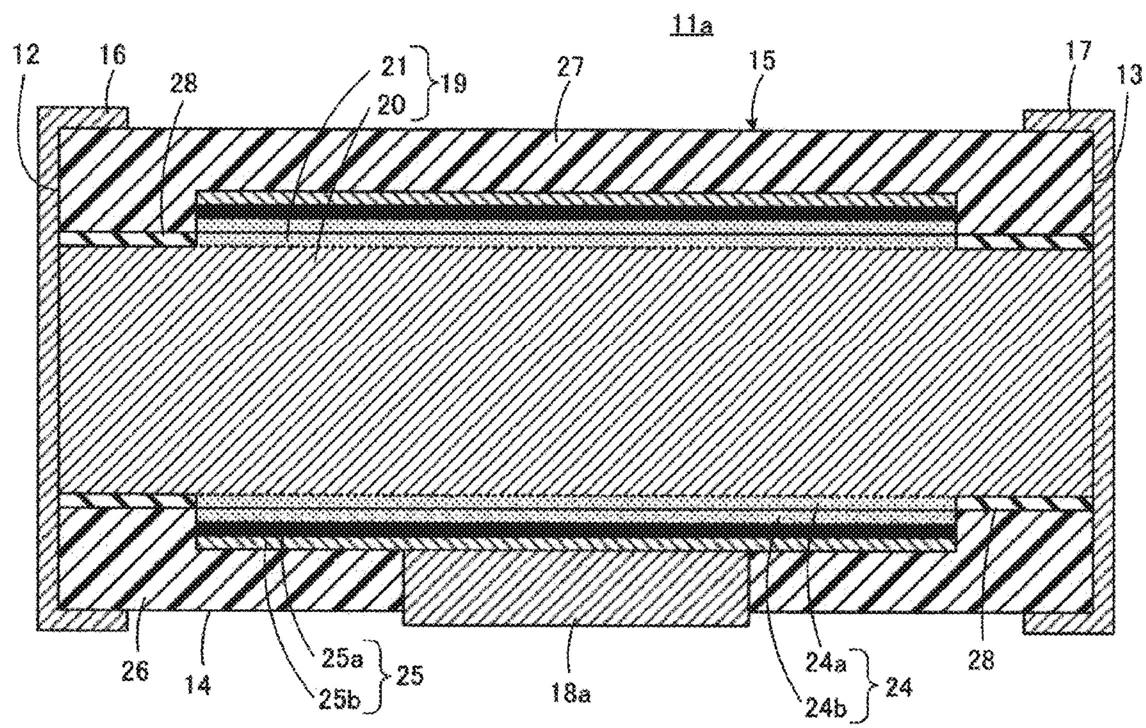
FIG. 5 is a view illustrating a second embodiment of the present invention, and is a view corresponding to FIG. 2(B).

FIG. 5 illustrates a second embodiment of the present invention, and is a view corresponding to FIG. 2(B). In FIG. 5, the element corresponding to the element in FIG. 2(B) is denoted by the same reference numeral, and the overlapping description will be omitted.

One of the features of a solid electrolytic capacitor 11*a* in FIG. 5 is that a cathode terminal 18*a* is made of a metal plate provided in the form of, for example, a lead frame. For this reason, the substrate such as the printed board is not used as the insulating material constituting main body 15, but only sealing material 27 is used.

FIGS. 6 to 9 illustrate third to sixth embodiments of the present invention, respectively. In FIGS. 6 to 9 illustrate portions corresponding to linear conductor 19, conductive polymer layer 24, and conductor layer 25 in FIG. 2(A). In FIGS. 6 to 9, the element corresponding to the element in FIG. 2(A) is denoted by the same reference numeral, and the overlapping description will be omitted.

In the first embodiment, conductive polymer layer 24 and the elements outside conductive polymer layer 24 are shared by three linear conductors 19. In the first embodiment, there is a concern that an equivalent series resistance (ESR) becomes higher than that of other embodiments, but the highest volume efficiency can be achieved.

Figure 6:
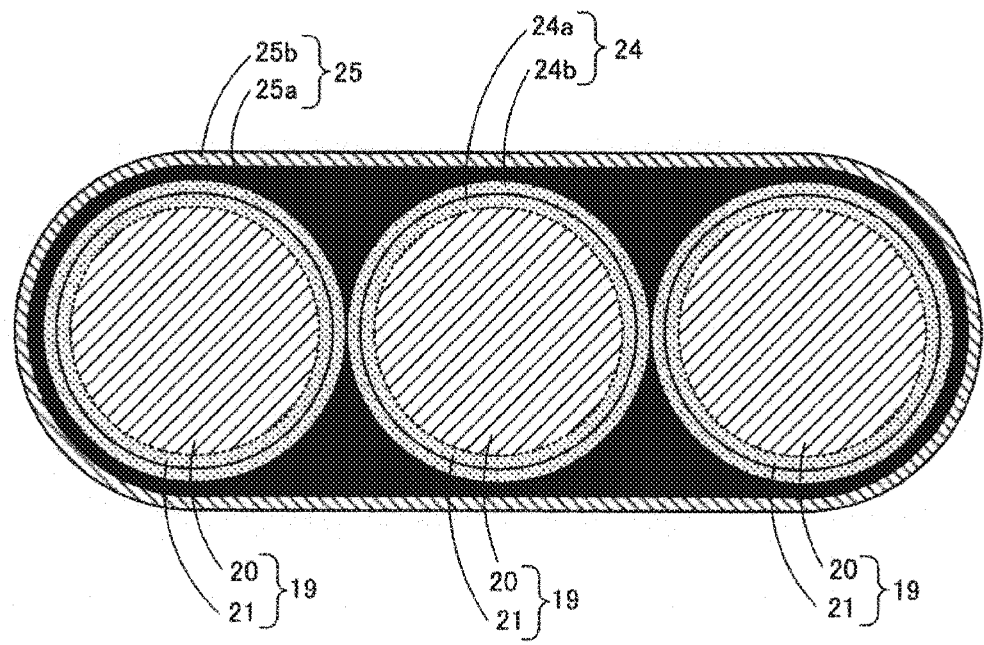
FIG. 6 is a view illustrating a third embodiment of the present invention, and is a sectional view illustrating a linear conductor 19, a conductive polymer layer 24, and a conductor layer 25.

On the other hand, carbon layer 25*a* and the elements outside carbon layer 25*a* are shared in the third embodiment of FIG. 6. In the state of FIG. 6, conductive polymer layers 24 located on three linear conductors 19 are arranged so as to be in contact with each other, but may slightly be separated from each other.

Figure 7:
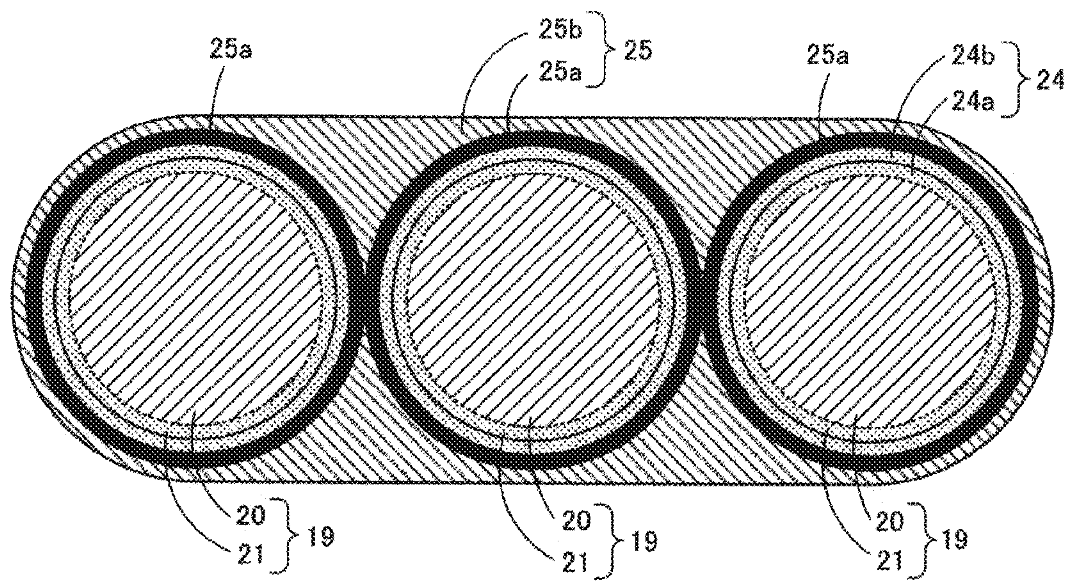
FIG. 7 is a view illustrating a fourth embodiment of the present invention, and is a sectional view illustrating linear conductor 19, conductive polymer layer 24, and conductor layer 25.

Metal layer 25*b* is shared in the fourth embodiment of FIG. 7. In the state of FIG. 7, carbon layers 25*a* each independently covering three linear conductors 19 are arranged so as to be in contact with each other, but may slightly be separated from each other. In the fourth embodiment, the ESR can further be decreased although the volume efficiency is inferior to that of the first and third embodiments.

Figure 8:
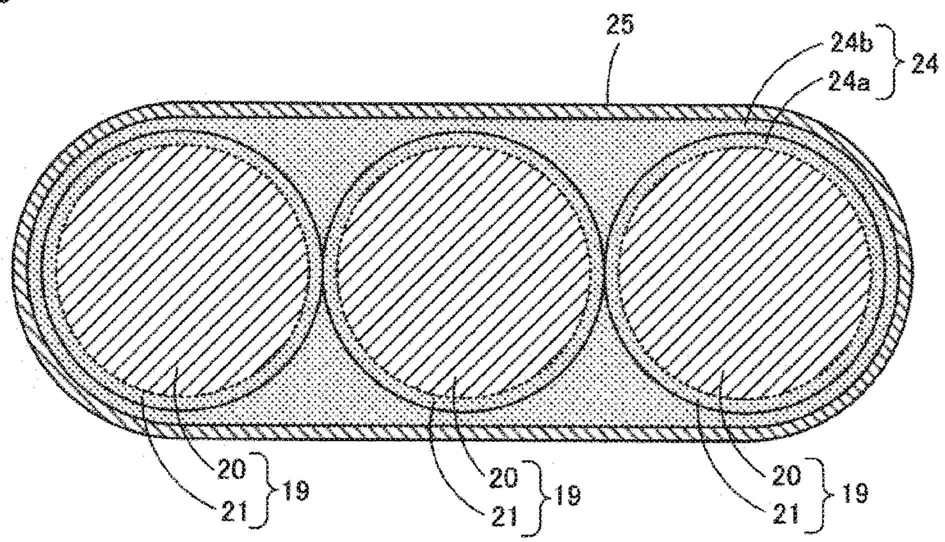
FIG. 8 is a view illustrating a fifth embodiment of the present invention, and is a sectional view illustrating linear conductor 19, conductive polymer layer 24, and conductor layer 25.

In the fifth embodiment of FIG. 8, as in the first embodiment, although conductive polymer layer 24 and the elements outside conductive polymer layer 24 are shared, conductor layer 25 outside conductive polymer layer 24 has a single-layer structure. Conductor layer 25 is form of a conductive resin or a plating film. A resin obtained by mixing carbon and silver, or silver, nickel, copper, or tin as a filler is used as the conductive resin. A film made of silver, nickel, copper, or tin is used as the plating film. In the state of FIG. 8, three linear conductors 19 are arranged so as to be in contact with each other, but may slightly be separated from each other.

Figure 9:
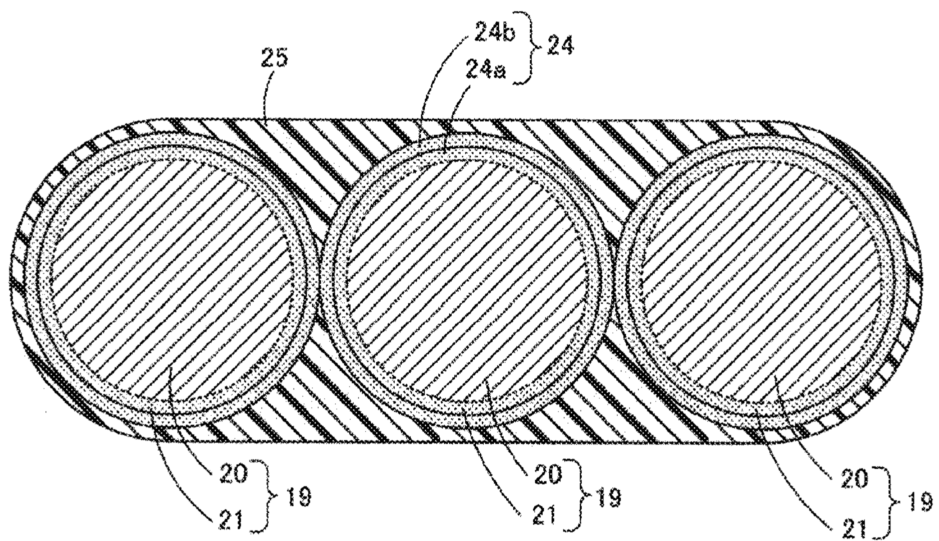
FIG. 9 is a view illustrating a sixth embodiment of the present invention, and is a sectional view illustrating linear conductor 19, conductive polymer layer 24, and conductor layer 25.

Conductor layer 25 outside conductive polymer layer 24 is shared in the sixth embodiment of FIG. 9. Shared conductor layer 25 is made of a conductive resin. A resin obtained by mixing carbon and silver, or silver, nickel, copper, or tin as a filler is used as the conductive resin. In the state of FIG. 9, conductive polymer layers 24 each independently on three linear conductors 19 are arranged so as to be in contact with each other, but may slightly be separated from each other.

Figure 10:
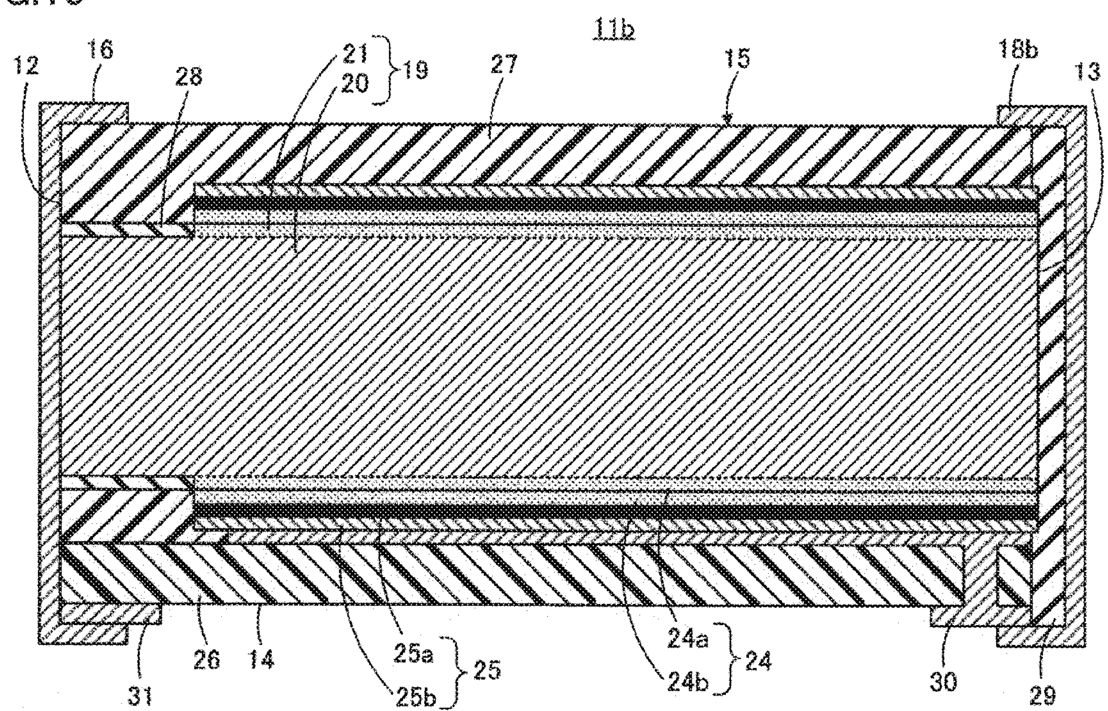
FIG. 10 is a view illustrating a seventh embodiment of the present invention, and is a view corresponding to FIG. 2(B).

FIG. 10 illustrates a seventh embodiment of the present invention, and is a view corresponding to FIG. 2(B). In FIG. 10, the element corresponding to the element in FIG. 2(B) is denoted by the same reference numeral, and the overlapping description will be omitted.

For example, solid electrolytic capacitor 11 in FIG. 2(A) is a three-terminal type, whereas a solid electrolytic capacitor 11*b* in FIG. 10 is a two-terminal type. In solid electrolytic capacitor 11*b*, anode terminal 16 is disposed on one end face 12 of main body 15, and a cathode terminal 18*b* is disposed on the other end face 13 of main body 15. Cathode-side electric insulating member 29 electrically insulating cathode terminal 18*b* from linear conductor 19, conductive polymer layer 24, and conductor layer 25 is provided along end face 13 of main body 15 in addition to anode-side electric insulating member 28 electrically insulating anode terminal 16 from conductive polymer layer 24 and conductor layer 25. Cathode-side electric insulating member 29 is formed by applying an insulating resin to end face 13 of main body 15. For example, an epoxy resin or a phenol resin is used as the insulating resin, and a filler may be mixed in the insulating resin. Dipping, printing, spraying, transfer, and the like are applied as an application method.

In solid electrolytic capacitor 11*b*, cathode terminal 18*b* is electrically connected to conductor layer 25 with connection conductor 30 interposed therebetween, connection conductor 30 penetrating substrate 26 in the thickness direction. A dummy conductor 31 is formed on the lower surface of substrate 26 on the side of end face 12. The thickness increase due to dummy conductor 31 is equivalent to the thickness increase brought to the lower surface side of substrate 26 by connection conductor 30.

With reference to FIGS. 11(A) through 18(B), a method for manufacturing a solid electrolytic capacitor will be described below. At this point, in particular, the method for manufacturing solid electrolytic capacitor 11 described with reference to FIGS. 1 to 4 will be taken up.

Figure 11A:
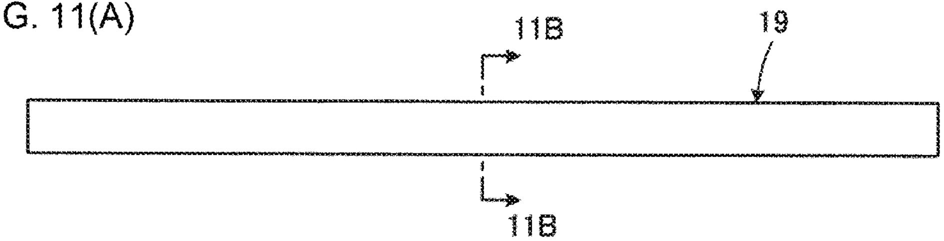
FIGS. 11(A) and 11(B) are views illustrating a method for manufacturing solid electrolytic capacitor 11 in FIG. 1, where
Figure 11B:
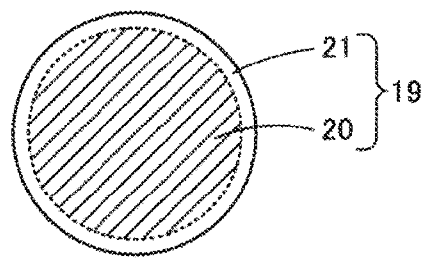

As illustrated in FIGS. 11(A) and 11(B), linear conductor 19 is prepared. The length of linear conductor 19 in FIG. 11(A) is longer than the length of one linear conductor 19 in FIG. 2(B), and it is expected that linear conductor 19 will be cut in a later process. In linear conductor 19, etching is performed to form porous portion 21 as illustrated in FIG. 11(B), and dielectric layer 23 (see FIGS. 3 and 4) formed by anodic oxidation is formed.

Figure 12A:
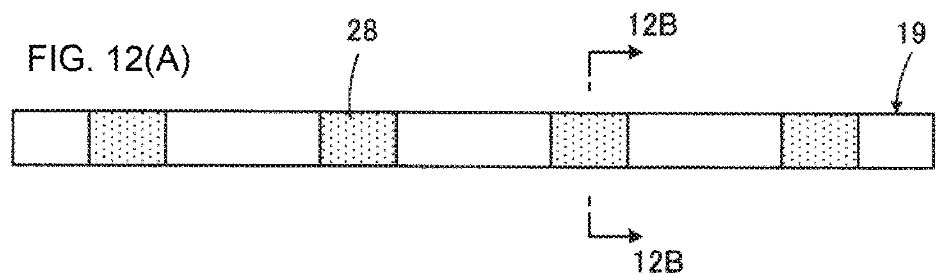
FIG. 12(A) is a plan view illustrating linear conductor 19 in which an anode-side electric insulating member 28 is formed.
Figure 12B:
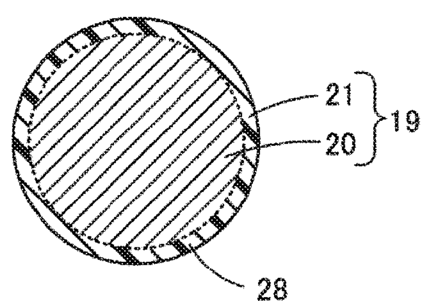
FIG. 12(B) is an enlarged sectional view taken along line 12B-12B in FIG. 12(A).

Subsequently, as illustrated in FIG. 12(A), anode-side electric insulating members 28 are formed on linear conductors 19 at predetermined intervals. As illustrated in FIG. 12(B), anode-side electric insulating member 28 becomes the state in which pores 22 (see FIGS. 3 and 4) of porous portion 21 are filled. Anode-side electric insulating member 28 is formed by masking a position other than a desired formation position, applying the insulating resin by a method such as dispensing, dipping, printing, transferring, spraying, and the like, and drying the insulating resin.

Subsequently, as illustrated in FIG. 13(A), in conductive polymer layers 24, first conductive polymer layer 24*a* is formed in a region other than the region where anode-side electric insulating member 28 is formed on linear conductor 19. As illustrated in FIG. 13(B), first conductive polymer layer 24*a* becomes the state in which pores 22 (see FIGS. 3 and 4) of porous portion 21 is filled.

First conductive polymer layer 24*a* is formed by masking a position other than a desired formation position, applying a material for first conductive polymer layer 24*a* by a method such as dispensing, dipping, printing, transferring, spraying, and the like, and drying the material. At this point, a chemical oxidative polymerization in which a monomer that is a precursor of a polymer and a reaction solution containing a dopant and an oxidant are alternately applied to perform a polymerization reaction, an electrolytic polymerization in which an electrochemical polymerization reaction is performed in the reaction solution, or a method for applying a solution in which a conductive polymer previously exhibiting conductivity is dissolved or dispersed in an arbitrary solvent can be applied.

Subsequently, as illustrated in FIG. 14, three linear conductors 19 are arranged in parallel.

The process of forming first conductive polymer layer 24*a* in FIG. 13 may be performed while three linear conductors 19 are arranged in parallel as illustrated in FIG. 14.

Figure 15A:
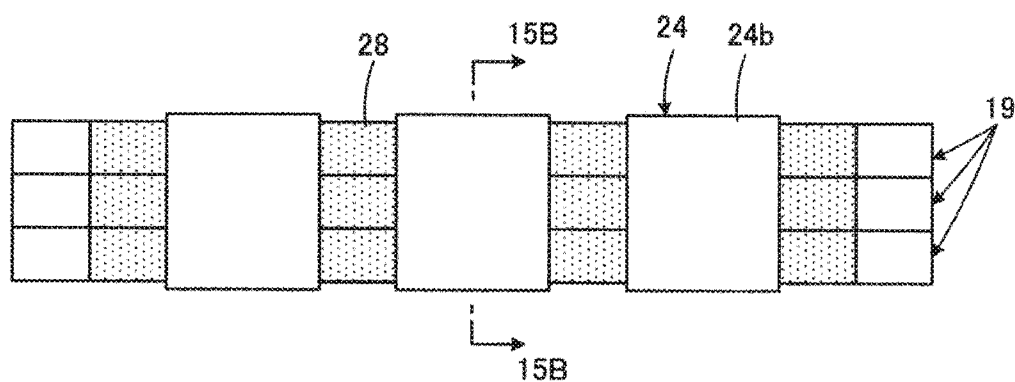
FIG. 15(A) is a plan view illustrating linear conductor 19 in which a second conductive polymer layer 24*b* is formed on first conductive polymer layer 24*a*.
Figure 15B:
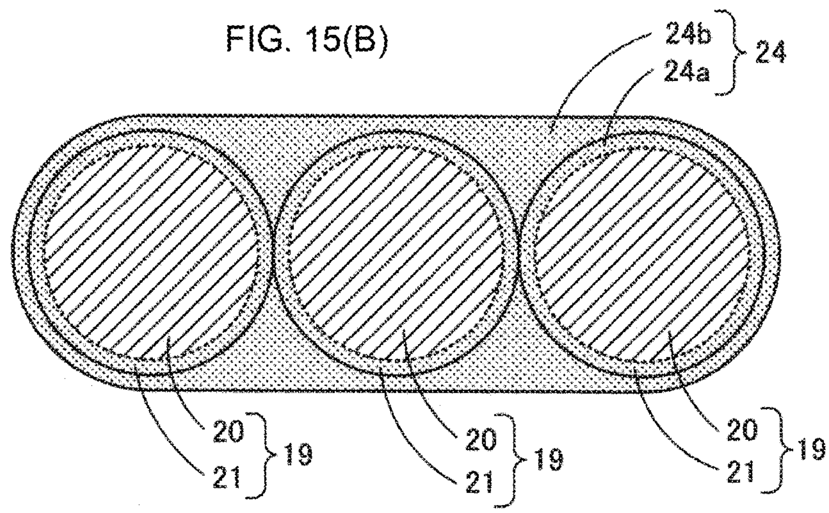
FIG. 15(B) is an enlarged sectional view along line 15B-15B in FIG. 15(A).

Subsequently, as illustrated in FIGS. 15(A) and 15(B), in order that the thickness of conductive polymer layer 24 is increased and first conductive polymer layer 24*a* separately formed on separate linear conductor 19 are connected in parallel, second conductive polymer layer 24*b* is formed so as to commonly overlap the region where first conductive polymer layer 24*a* is formed on three linear conductors 19 arranged in parallel.

Second conductive polymer layer 24*b* is formed by masking a position other than a desired formation position, applying a material for second conductive polymer layer 24*b* by a method such as dispensing, dipping, printing, transferring, spraying, and the like, and drying the material. For second conductive polymer layer 24*b*, similarly to the case of first conductive polymer layer 24*a*, a chemical oxidative polymerization in which a monomer that is a precursor of a polymer and a reaction solution containing a dopant and an oxidant are alternately applied to perform a polymerization reaction, an electrolytic polymerization in which an electrochemical polymerization reaction is performed in the reaction solution, or a method for applying a solution in which a conductive polymer previously exhibiting conductivity is dissolved or dispersed in an arbitrary solvent can be applied.

As described above, a configuration in which conductive polymer layer 24 is shared by three linear conductors 19 is obtained.

Subsequently, as illustrated in FIGS. 16(A) and 16(B), carbon layer 25*a* and metal layer 25*b* are sequentially formed on the region where conductive polymer layer 24 is formed, thereby forming conductor layer 25. Each of carbon layer 25*a* and metal layer 25*b* is formed by applying the process of masking a position other than a desired formation position, applying the conductive resin and a plating solution by a method such as dispensing, dipping, printing, transferring, spraying, and the like, and drying them.

Subsequently, as illustrated in FIG. 17, substrate 26 holding cathode terminal 18 is prepared.

Subsequently, a structure 32 in FIG. 16 is placed on substrate 26, and cathode terminal 18 and conductor layer 25 are bonded together by, for example, a conductive adhesive. Structure 32 in FIG. 16 is indicated by an alternate long and short dash line in FIG. 17.

Figure 18A:
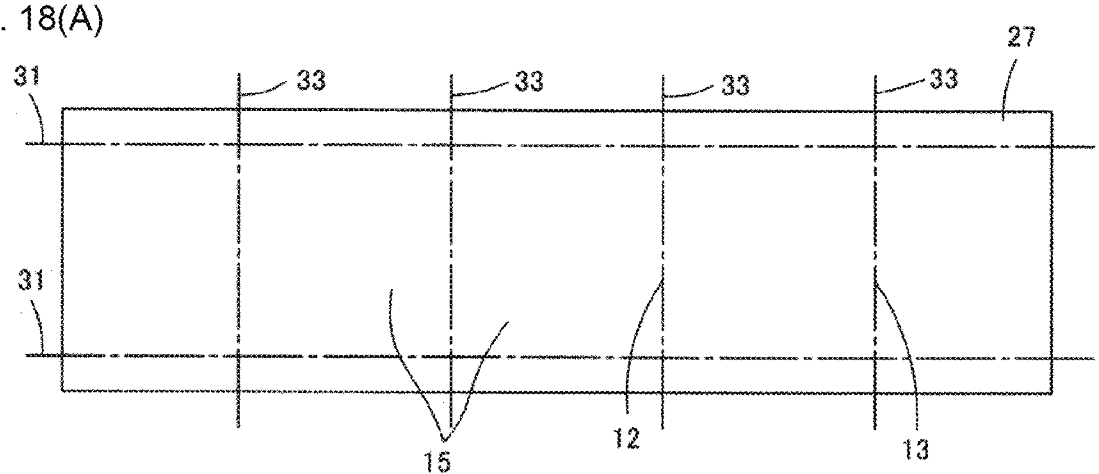
FIG. 18(A) is a plan view illustrating a state in which resin sealing is performed using a sealing material 27 after a structure 32 in FIG. 16 is disposed on substrate 26 in FIG. 17.

Subsequently, as illustrated in FIG. 18, resin sealing is performed so as to cover substrate 26, and thereby forming sealing material 27. Transfer molding, compression molding, thermocompression bonding, or the like is applied to form sealing material 27.

As described above, in molding sealing material 27, an external stress applied to linear conductor 19 is advantageously dispersed because linear conductor 19 has a cylindrical shape. Thus, during the molding of sealing material 27, a situation in which linear conductor 19 is damaged can advantageously be avoided.

When linear conductor 19 has a columnar shape, sealing material 27 has an excellent filling property. Thus, because sealing material 27 has a high packaging effect, a barrier property against moisture and air is high, and obtained solid electrolytic capacitor 11 has excellent moisture resistance and heat resistance.

Figure 18B:
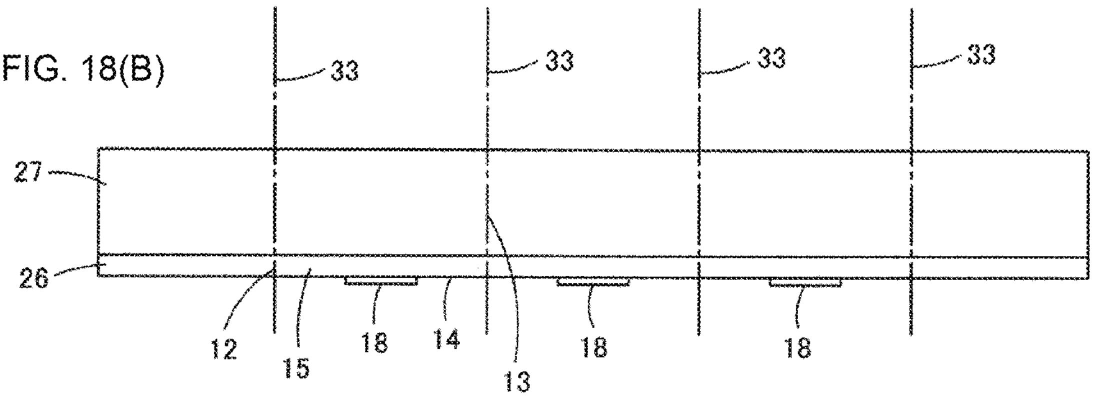
FIG. 18(B) is a side view of the same.
Figure 19:
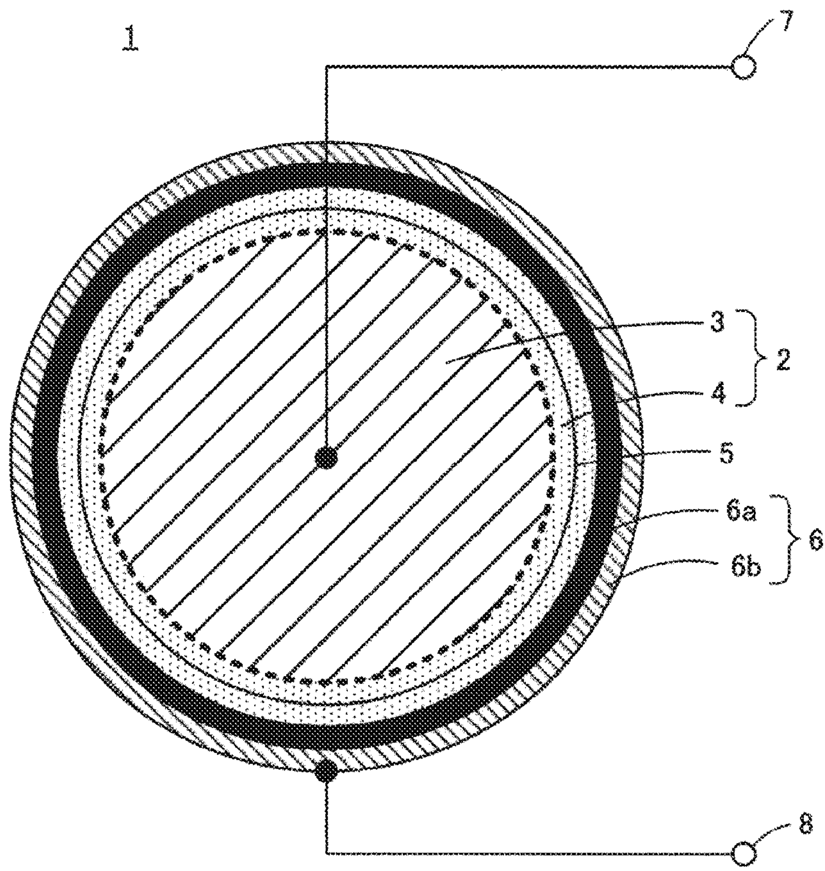
FIG. 19 is a sectional view schematically illustrating a solid electrolytic capacitor 1 having the same basic configuration as a solid electrolytic capacitor described in PTL 1.

Subsequently a cutting process along cutting lines 33 and 34 illustrated by an alternate long and short dash line in FIG. 18 is performed using, for example, a dicer or a laser. Main body 15 for a plurality of solid electrolytic capacitors 11 is obtained through the cutting process. At this point, a cut surface that appears by cutting along a cutting line 33 constitutes end faces 12 and 13 of main body 15. As can be seen from FIG. 18(B), cathode terminal 18 is exposed on bottom surface 14 of main body 15.

Subsequently, anode terminals 16 and 17 are formed so as to be connected to both the end faces of linear conductor 19 exposed to end faces 12 and 13 of main body 15. In order to form anode terminals 16 and 17, for example, a conductive resin is prepared, and dipping, spraying, transfer, or the like is applied. A plating film may further be formed on the conductive resin film formed in this way.

As described above, the method for manufacturing solid electrolytic capacitor 11 of the first embodiment is described as the method for manufacturing a solid electrolytic capacitor. However, a basic configuration of the manufacturing method can also be applied to a method for manufacturing the solid electrolytic capacitor of other embodiments.

For example, in the method for manufacturing the solid electrolytic capacitor of the second embodiment in FIG. 5, a lead frame functioning as cathode terminal 18*a* is used instead of substrate 26 holding cathode terminal 18 in processes at and after the process in FIG. 17.

In the method for manufacturing the solid electrolytic capacitor of the third to sixth embodiments in FIGS. 6 to 9, similarly to the same method as the method for manufacturing solid electrolytic capacitor 11 of the first embodiment, three linear conductors 19 are arranged in parallel in performing the process of forming the shared element.

As described above, the present invention is described above in reference to the illustrated embodiments. However, these embodiments are merely examples, and it is understood that partial replacement or combination of the configurations between different embodiments can be made.

REFERENCE SIGNS LIST

- 11, 11*a*, 11*b*: solid electrolytic capacitor
- 12, 13: end face
- 14: bottom face
- 15: main body
- 16, 17: anode terminal
- 18, 18*a*, 18*b*: cathode terminal
- 19: linear conductor
- 20: core
- 21: porous portion
- 22: pore
- 23: dielectric layer
- 24: conductive polymer layer
- 25: conductor layer
- 25*a*: carbon layer
- 25*b*: metal layer
- 26: substrate
- 27: sealing material
- 28: anode-side electric insulating member
- 29: cathode-side electric insulating member

The invention claimed is:

1. A solid electrolytic capacitor comprising:

a plurality of linear conductors arranged in parallel, each of the plurality of linear conductors made of a valve action metal and having a pillar shape, each of the plurality of linear conductors including:

a core extending in an axial direction of each of the plurality of linear conductors and a porous portion covering a peripheral surface of the core and including a number of pores; and a dielectric layer on a surface of the valve action metal;

a conductive polymer layer covering all of the plurality of linear conductors and shared by all of the plurality of linear conductors;

a conductor layer covering the conductive polymer layer;

an insulating material covering the plurality of linear conductors, the conductive polymer layer, and the conductor layer;

an anode terminal connected to an end face of each of the cores exposed from the insulating material; and a cathode terminal electrically connected to the conductor layer.

2. The solid electrolytic capacitor according to claim 1, wherein the solid electrolytic capacitor comprises a rectangular parallelopiped-shaped main body that includes a pair of end faces facing each other and a bottom surface adjacent to the end face, wherein the anode terminal includes a pair of anode terminals on the pair of end faces of the main body, and the cathode terminal is on the bottom surface of the main body, and the solid electrolytic capacitor further comprises:

an anode-side electric insulating member electrically insulating each of the pair of anode terminals from the conductive polymer layer and the conductor layer.

3. The solid electrolytic capacitor according to claim 1, wherein the solid electrolytic capacitor comprises a rectangular parallelopiped-shaped main body that includes a pair of end faces facing each other and a bottom surface adjacent to the end face, wherein the anode terminal is on a first of the pair of end faces of the main body, and the cathode terminal is on a second of the pair of end faces of the main body, and the solid electrolytic capacitor further comprises:

an anode-side electric insulating member electrically insulating the anode terminal from the conductive polymer layer and the conductor layer; and a cathode-side electric insulating member electrically insulating the cathode terminal from the linear conductors, the conductive polymer layer and the conductor layer.

4. The solid electrolytic capacitor according to claim 1, wherein the conductor layer has a laminated structure including a carbon layer in contact with the conductive polymer layer and a metal layer on the carbon layer.

5. The solid electrolytic capacitor according to claim 1, wherein the dielectric layer extends along an inner peripheral surface of the pores of the porous portion.

6. The solid electrolytic capacitor according to claim 5, wherein the anode terminal is in contact with the respective core of the plurality of linear conductors.

7. A solid electrolytic capacitor comprising:

a plurality of linear conductors arranged in parallel, each of the plurality of linear conductors made of a valve action metal and having a pillar shape, each of the plurality of linear conductors including:

a core extending in an axial direction of each of the plurality of linear conductors and a porous portion covering a peripheral surface of the core and including a number of pores; and a dielectric layer on a surface of the valve action metal;

a conductive polymer layer separately covering each of the linear conductors;

a conductor layer covering all of the plurality of linear conductors and shared by all of the plurality of linear conductors;

an insulating material covering the plurality of linear conductors, the conductive polymer layer, and the conductor layer;

an anode terminal connected to an end face of each of the cores exposed from the insulating material; and a cathode terminal electrically connected to the conductor layer.

8. The solid electrolytic capacitor according to claim 7, wherein the solid electrolytic capacitor comprises a rectangular parallelopiped-shaped main body that includes a pair of end faces facing each other and a bottom surface adjacent to the end face, wherein the anode terminal includes a pair of anode terminals on the pair of end faces of the main body, and the cathode terminal is on the bottom surface of the main body, and the solid electrolytic capacitor further comprises:

an anode-side electric insulating member electrically insulating each of the pair of anode terminals from the conductive polymer layer and the conductor layer.

9. The solid electrolytic capacitor according to claim 7, wherein the solid electrolytic capacitor comprises a rectangular parallelopiped-shaped main body that includes a pair of end faces facing each other and a bottom surface adjacent to the end face, wherein the anode terminal is on a first of the pair of end faces of the main body, and the cathode terminal is on a second of the pair of end faces of the main body, and the solid electrolytic capacitor further comprises:

an anode-side electric insulating member electrically insulating the anode terminal from the conductive polymer layer and the conductor layer; and a cathode-side electric insulating member electrically insulating the cathode terminal from the linear conductors, the conductive polymer layer and the conductor layer.

10. The solid electrolytic capacitor according to claim 7, wherein the conductor layer has a laminated structure including a carbon layer in contact with the conductive polymer layer and a metal layer on the carbon layer.

11. The solid electrolytic capacitor according to claim 7, wherein the dielectric layer extends along an inner peripheral surface of the pores of the porous portion.

12. The solid electrolytic capacitor according to claim 11, wherein the anode terminal is in contact with the respective core of the plurality of linear conductors.

13. A method for manufacturing a solid electrolytic capacitor, the method comprising:

preparing a plurality of linear conductor made of a valve action metal in which a dielectric layer is formed on a surface of the valve action metal, each of the plurality of linear conductors having a pillar shape and including a core extending in an axial direction of each of the plurality of linear conductors and a porous portion covering a peripheral surface of the core and including a number of pores;

arranging the plurality of linear conductors in parallel;

covering the plurality of linear conductors with a conductive polymer layer;

covering the conductive polymer layer with a conductor layer;

covering the plurality of linear conductors, the conductive polymer layer, and the conductor layer with an insulating material;

providing an anode terminal so as to be connected to an end face of each of the cores exposed from the insulating material; and electrically connecting a cathode terminal to the conductor layer.

14. The method for manufacturing a solid electrolytic capacitor according to claim 13, wherein the conductive polymer layer is formed so as to cover all of the plurality of linear conductors such that all of the plurality of linear conductors share the conductive polymer layer.

15. The method for manufacturing a solid electrolytic capacitor according to claim 14, wherein the dielectric layer extends along an inner peripheral surface of the pores of the porous portion.

16. The method for manufacturing a solid electrolytic capacitor according to claim 13, wherein the conductor layer is formed so as to cover all of the plurality of linear conductors such that all of the plurality of linear conductors share the conductor layer.

17. The method for manufacturing a solid electrolytic capacitor according to claim 16, wherein the dielectric layer extends along an inner peripheral surface of the pores of the porous portion.

18. The method for manufacturing a solid electrolytic capacitor according to claim 13, wherein the solid electrolytic capacitor comprises a rectangular parallelopiped-shaped main body that includes a pair of end faces facing each other and a bottom surface adjacent to the end face, wherein the anode terminal includes a pair of anode terminals on the pair of end faces of the main body, and the cathode terminal is on the bottom surface of the main body, and the method for manufacturing the solid electrolytic capacitor further comprises:

forming an anode-side electric insulating member so as to electrically insulate each of the pair of anode terminals from the conductive polymer layer and the conductor layer.

19. The method for manufacturing a solid electrolytic capacitor according to claim 13, wherein the solid electrolytic capacitor comprises a rectangular parallelopiped-shaped main body that includes a pair of end faces facing each other and a bottom surface adjacent to the end face, wherein the anode terminal is on a first of the pair of end faces of the main body, and the cathode terminal is on a second of the pair of end faces of the main body, and the method for manufacturing the solid electrolytic capacitor further comprises:

forming an anode-side electric insulating member so as to electrically insulate the anode terminal from the conductive polymer layer and the conductor layer; and forming a cathode-side electric insulating member so as to electrically insulate the cathode terminal from the linear conductors, the conductive polymer layer and the conductor layer.

20. The method for manufacturing a solid electrolytic capacitor according to claim 13, wherein the conductor layer is formed by laminating a carbon layer on the conductive polymer layer and a metal layer on the carbon layer.

21. The solid electrolytic capacitor according to claim 1, wherein the pillar shape includes a columnar shape, an elliptic columnar shape, a flat columnar shape, or a prism shape having a rounded ridge portion.

22. The solid electrolytic capacitor according to claim 7, wherein the pillar shape includes a columnar shape, an elliptic columnar shape, a flat columnar shape, or a prism shape having a rounded ridge portion.

23. The method for manufacturing a solid electrolytic capacitor according to claim 13, wherein the pillar shape includes a columnar shape, an elliptic columnar shape, a flat columnar shape, or a prism shape having a rounded ridge portion.

* * * * *